United States Patent [19]

Guarnery et al.

[11] 4,250,006

[45] Feb. 10, 1981

[54] POLYMERIZABLE COATING COMPOSITION CONTAINING POLYMERIZABLE EPOXIDE COMPOUND AND VINYL CHLORIDE DISPERSION POLYMER AND METHOD OF COATING UTILIZING SAME AND COATED ARTICLES PRODUCED THEREBY

[75] Inventors: Joseph M. Guarnery, Libertyville; Dennis E. Kester, Crystal Lake, both of Ill.

[73] Assignee: American Can Company, Greenwich, Conn.

[21] Appl. No.: 21,914

[22] Filed: Mar. 19, 1979

[51] Int. Cl.³ .................... C08L 27/22; C08J 7/10
[52] U.S. Cl. .................... 204/159.18; 204/159.2; 260/42.28; 525/121
[58] Field of Search .............. 525/121; 204/159.14, 204/159.2, 159.18

[56] References Cited

U.S. PATENT DOCUMENTS

| | | | |
|---|---|---|---|
| 2,964,454 | 12/1960 | Findley | 204/159.2 |
| 3,354,109 | 11/1967 | Evans et al. | 525/121 |
| 3,714,006 | 1/1973 | Anderson | 204/159.14 |
| 3,794,576 | 2/1974 | Watt | 260/30.4 EP |
| 3,912,605 | 10/1975 | Nishio et al. | 204/159.14 |
| 4,058,401 | 11/1977 | Crivello | 204/159.18 |
| 4,069,055 | 1/1978 | Crivello | 204/159.18 |
| 4,090,936 | 5/1978 | Barton | 204/159.18 |

OTHER PUBLICATIONS

*Journal of Radiation Curing*, vol. 5, No. 1, Jan. 1978, pp. 2, 10 and 11.

*Primary Examiner*—Wilbert J. Briggs, Sr.
*Attorney, Agent, or Firm*—Robert P. Auber; Ira S. Dorman; Peter L. Costas

[57] ABSTRACT

A polymerizable coating composition comprises 35-80 parts of an epoxy prepolymer material and 20-65 parts of a vinyl chloride dispersion polymer together with 0.5-10 percent by weight, based upon the weight of the epoxy prepolymer material, of an onium salt photoinitiator which decomposes upon exposure to electromagnetic radiation to initiate polymerization of the epoxy prepolymer material. The vinyl chloride polymer has a high molecular weight represented by an inherent viscosity of 0.60-1.60 and a particle size of 0.5-20.0 microns. The coating is applied to the surface of a substrate and then exposed to a source of electromagnetic radiation to decompose the photoinitiator and initiate polymerization of the epoxy prepolymer material to a tack-free surface condition in which the vinyl chloride polymer is dispersed within the epoxy polymer. This is desirably effected by maintaining the coating at a temperature of about 50°-90° C. for a limited time following exposure to radiation. After the coating has been cured to a tack-free condition, it is desirably baked at a temperature of at least 150° C. to effect substantial fusion of the vinyl chloride polymer and cross-linking of the epoxy polymer.

20 Claims, No Drawings

POLYMERIZABLE COATING COMPOSITION CONTAINING POLYMERIZABLE EPOXIDE COMPOUND AND VINYL CHLORIDE DISPERSION POLYMER AND METHOD OF COATING UTILIZING SAME AND COATED ARTICLES PRODUCED THEREBY

BACKGROUND OF THE INVENTION

For a number of years the coating industry has been engaged in substantial developmental programs in the quest for procedures which would allow the coating of substrates at high production rates with the coating being cured to a tack-free condition at a speed commensurate with the contiguous processing steps. The industry has desired to eliminate the volatile solvents required in many of the well-known coating processes because of potential hazards or because of the cost of equipment to handle the evolved solvent vapors. In addition, the industry has been seeking coating formulations which would produce coatings which were durable and which would permit substantial additional processing of the workpiece, such as metal forming operations where the substrate is metal strip for container bodies, blanks and closures.

Epoxy coating formulations have long been recognized as affording desirable properties in the finished coating, especially the toughness to withstand further processing. However, the problem has remained to develop a low cost epoxy coating formulation which would combine the desired rheological properties for the coating application with both reasonable pot life and rapid curing in the production line.

In Watt U.S. Pat. No. 3,794,576 granted Feb. 26, 1974, there are described desirable epoxy formulations which combine the desired rheological properties with suitable pot life and rapid curing, by incorporation of a photoinitiator and at least about 15 percent by weight of an epoxidic ester having two epoxycycloalkyl groups. However, such esters materially increase the cost of the formulation as compared with the more conventional epoxide prepolymer materials.

Since the disclosure of Watt, a number of patents and publications have appeared proposing various photoinitiators for the epoxy formulations which could replace the diazonium catalysts specifically described in the Watt patent. Among these are the onium catalysts disclosed in Barton U.S. Pat. No. 4,090,936 granted May 23, 1978; Crivello U.S. Pat. Nos. 4,069,055 granted Jan. 17, 1978 and 4,058,401 granted Nov. 15, 1977.

Although it has long been known that heat will accelerate the reaction rate of polymerization following irradiation to effect complete curing, generally in accordance with the Arrhenius equation, and has long been suggested to augment the irradiation treatment (see, for example, the aforementioned Watt patent at Column 6, lines 1–16), such heating has also been recognized to introduce other problems in the form of production requirements and possible adverse effects upon the polymer properties since low molecular weight polymers may result. Some researchers have evaluated various factors affecting cure rate in such irradiated epoxide formulations and have proposed substantially elevated temperatures to increase the cure rate while avoiding volatilization of the monomer (See, Crivello et al, "Triaryl Sulfonium Salts: A New Class of Photoinitiators for Cationic Polymerization," JOURNAL OF RADIATION CURING, Volume 5, pages 2, 10–11, January 1978).

In the copending application of Joseph M. Guarnery and William R. Watt, Ser. No. 20,515, filed Mar. 14, 1979, entitled RAPID CURING OF EPOXY RESIN COATING COMPOSITIONS BY COMBINATION OF PHOTOINITATION AND CONTROLLED HEAT APPLICATION, there is disclosed a process in which the coating is maintained at a temperature of 50°–90° C. for a period of 0.5–2 minutes following initiation of exposure to radiation to effect rapid curing to a tack-free condition.

However, the problem has remained to provide relatively economical coating compositions which would provide the benefits of epoxy polymers but at lower cost. Inclusion of inert fillers has tended to undesirably effect polymer properties, and inclusion of most polymeric materials as fillers results in stability or rheological problems.

Accordingly, it is an object of the present invention to provide a novel photoinitiable epoxy composition which is relatively economical and which can produce a tack-free surface condition rapidly for use on high speed production equipment.

It is also an object to provide such a composition which is relatively stable in rheological properties and which generates a coating which exhibits highly desirable mechanical properties.

Another object is to provide a novel coating process using such compositions which is adaptable to a wide variety of high speed coating lines and which does not require extensive or expensive equipment.

A further object is to provide such a method in which the polymeric materials of the coating composition are integrated into a strong, adherent polymeric film.

SUMMARY OF THE INVENTION

It has now been found that the foregoing and related objects may be readily attained in a polymerizable coating composition comprising 35–80 parts of an epoxidic prepolymer material including not more than about 15 percent by weight of cycloaliphatic epoxide compounds; and 20–65 parts of a vinyl chloride dispersion polymer. The particles of the vinyl chloride polymer are dispersible in the epoxidic prepolymer material and are wettable thereby but substantially insoluble therein. The coating composition also includes 0.5–10.0 percent by weight of the epoxidic prepolymer material of a photoinitiator which decomposes upon exposure to electromagnetic radiation to initiate polymerization of the epoxidic prepolymer material.

In the preferred composition, the epoxidic prepolymer material comprises 45–65 parts and the vinyl chloride dispersion polymer comprises 35–55 parts; the vinyl chloride polymer is a homopolymer of vinyl chloride. Alternatively, the vinyl chloride polymer may be a copolymer of vinyl chloride with minor amounts of vinyl acetate. The epoxidic prepolymer material is substantially free from cycloaliphatic epoxide compounds, and is desirably comprised principally of aliphatic and aromatic glycidyl ethers. In addition, the coating composition may include 1–10 percent by weight of a pigment which is substantially nonabsorbent of radiation of the wavelength to which the initiator is susceptible.

In the method of coating substrate with the organic coating material, a substrate is coated with the coating formulation; and the coating is exposed to a source of electromagnetic radiation to decompose the photoinitiator to initiate polymerization of the epoxidic prepolymer material to an epoxy polymer and effect curing of the coating to a tack-free surface condition in which the vinyl chloride polymer is dispersed within the epoxy polymer. Preferably, the coating is maintained at a temperature of about 50°–90° C. for a period of at least about 0.5 second and less than about 2 minutes following initiation of the exposure to radiation to effect polymerization of the coating to a substantially tack-free condition in a period of less than 30 seconds following the combination of the steps of radiation exposure and temperature maintenance. Following the decomposition of the catalyst and the curing of the coating to a tack-free condition, the coating is baked at a temperature of at least 140° C. for a period of at least 2 minutes to effect substantial fusion of the vinyl chloride polymer and substantial cross-linking of the epoxy polymer.

As a result, there is produced an article having a substrate and a coating on at least one surface thereof in which the coating comprises (1) 35–80 percent, based upon resin content, of an epoxy polymer including not more than about 15 percent by weight cycloaliphatic epoxide compounds based upon the total weight of the epoxy polymer, and (2) 20–65 percent, based upon resin content, of a vinyl chloride dispersion polymer. The vinyl chloride dispersion polymer is dispersed within and bonded to the epoxy polymer, and the particles of vinyl chloride polymer being substantially fused and the epoxy polymer being substantially cross-linked. For some applications, the coating includes 1–10 percent of a pigment; while for others, the coating is substantially transparent.

DETAILED DESCRIPTION OF THE PREFERRED EMBODIMENTS

As previously indicated, the coating compositions utilized in the present invention essentially comprise a mixture of an epoxidic prepolymer material, a vinyl chloride dispersion polymer, and a radiation-sensitive initiator for the epoxidic prepolymer material. Other components such as pigments, dyes, fillers and diluents may be incorporated if so desired.

The epoxidic prepolymer materials which may be used herein comprise any monomeric or oligomeric material containing at least one functional epoxy group or oxirane ring so that they may be polymerized upon opening of the oxirane ring. In addition, polymeric epoxy materials may be employed if they may be dispersed in a fluid coating composition and are capable of undergoing further polymerization to produce a solid polymer coating. The epoxy compounds may be aliphatic, aromatic or heterocyclic, but the epoxy materials should not include more than 15 percent by weight thereof of compounds having epoxycycloalkyl groups, and preferably should exclude such compounds.

The epoxidic prepolymer material should contain no functional groups more basic than the oxirane ring and it should be a solvent for the initiator. Most desirably, the prepolymer material should contain a reasonable percentage of epoxy compounds containing two or more epoxy groups per molecule.

The polymerizable material will be epoxide resins used either singly or in combination and will have an average epoxide value of about 0.1–1.0. The carbon chains having the epoxy groups may include additional substituents including ethers, esters, halogens, phosphates, and the like, and the compounds may include other polymerizable functional groups such as acrylates and silicones.

Typical epoxy materials are readily available commercially, the most common being those which are the product of bis-phenol A with epicholorohydrin or those resulting from the reaction of epichlorohydrin with a phenol/formaldehyde resin of relatively low molecular weight. Reference may be made to the HANDBOOK OF EPOXY RESINS by H. Lee and K. Neville (McGraw-Hill 1967) for various epoxides. In addition, the technical literature and patent literature both contain extensive discussions of various epoxidic prepolymer materials which are useful in the compositions of the present invention as will be demonstrated hereinafter.

In W. R. Watt U.S. Pat. No. 3,794,576, granted Feb. 26, 1974, there are described radiation-sensitive epoxidic blends containing at least about 15 percent by weight of an epoxidic ester having at least two epoxycycloalkyl groups per molecule in order to achieve polymerization and curing of the composition rapidly upon exposure to ultraviolet radiation or the like. The compositions of the present invention desirably do not include such epoxycycloalkyl esters, or epoxidic esters having only one epoxycycloalkyl group per molecule; if included at all, the compositions should contain less than 15 percent by weight thereof, since they have been found to undesirably swell the dispersion polymer and unduly affect rheological properties. In addition, they appear to penetrate into the vinyl chloride polymer so that they do not provide the room temperature curing benefits of the epoxy compositions of the Watt Patent.

Although not essential and sometimes undesirable, the polymerizable epoxy composition may contain diluents to improve viscosity, and these diluents may be reactive such as those produced by reaction of an alcohol or a phenol with epicholorohydrin. Exemplary of reactive diluents is the reaction product of nonylphenol with epichlorohydrin. The amount of diluent may vary from zero to as much as 45 percent of the epoxy component if a reactive diluent is employed and is preferably less than 15 percent if nonreactive diluents such as dibutylphthalate are employed.

The second component of the composition is a vinyl chloride dispersion polymer which is wettable by, but substantially insoluble in, the epoxy prepolymer material. Generally, the polymers will be homopolymers of vinyl chloride, although copolymers of vinyl chloride with up to 15 percent by weight, and preferably less than 10 percent by weight, of vinyl acetate may be employed. Conventionally, such dispersion polymers have a high molecular weight as represented by an inherent viscosity of 0.60–1.60 as determined by the method of ASTM D1243-66 and a particle size of 0.5–20.0 microns, and are produced by emulsion polymerization processes.

The two resin components are generally admixed in a weight ratios of 35–80 parts epoxy prepolymer material to 20–60 parts vinyl chloride polymer. Preferably, the ratio is 45–65 epoxy prepolymer material to 35–55 vinyl chloride polymer. The ratio may be varied to modify the difference between the glass transition temperature (Tg) of the two components within the coating. This is desirable to ensure that the processing temperature to which the coated substrate will be subjected will normally fall between the two glass transition temperatures.

For some applications, the composition may contain an inert pigment or dye to provide a desired coloration. Generally, such pigments and dyes will comprise less than about 10 percent by weight of the composition. The dyes and pigments which may be employed should not contain any groups which are more basic than the oxirane oxygen of the epoxy prepolymer materials so as not to interfere with the operation of the photoinitiator. Thus, some dyes which contain nitrogen atoms can present problems. The dyes and pigments also should not be absorptive of radiation of the wavelength intended to decompose a suitable photoinitiator. Suitable pigments include titanium dioxide, carbon black and metallic pigments such as chrome yellow. For certain applications, it may be desired to include an inert filler, but such fillers may be deleterious to the desired properties for the coating and will normally comprise less than 15 percent by weight and preferably less than 10 percent by weight of the polymerizable composition.

The third essential component of the polymerizable composition is the radiation-sensitive initiator which will decompose upon exposure to electromagnetic radiation so as to provide a Lewis acid which is effective to initiate polymerization of the epoxidic prepolymer material.

The term "Lewis acid," as used herein, is intended to encompass compounds produced by decomposition and which will directly or indirectly generate a Lewis acid to receive an electron pair from the oxygen of the oxirane ring to open the oxirane ring and produce an active site on the monomer for polymerization. The classic Lewis acid precursor decomposition mechanism is described in the aforementioned Watt U.S. Pat. No. 3,794,576 with respect to a diazonium initiator.

The decomposition mechanism for triarylsulfonium salts has been postulated by Crivello et al in "Triarylsulfonium Salts: A New Class of Photoinitiators for Cationic Polymerization" in JOURNAL OF RADIATION CURING, Vol. 5, page 2 (January 1978). The authors postulate that the decomposition of the diaryl- and triaryl- sulfonium salts produces a Brønsted acid which in turn provides a proton which will function as the Lewis acid to accept electrons from the oxygen of the oxirane ring and initiate polymerization in accordance with the following mechanism:

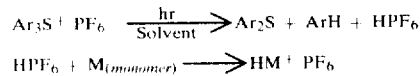

Regardless of the theory of the action embraced, it is apparent that the photoinitiator is decomposing to generate in the reaction medium an electron acceptor acting as a Lewis acid to open the oxirane ring and thereby initiate cationic polymerization of the epoxidic prepolymer material. The reaction then proceeds as additional oxirane rings are opened until all of the monomer has been polymerized or until impurities interfere with the reaction mechanism.

Specific examples of the various classes of photoinitiators usable in the present invention are the following: diphenyliodonium tetrafluoroborate; di(2,4-dichlorophenyl)iodonium hexafluorophosphate; diphenyliodonium hexafluorophosphate; diphenyliodonium hexafluoroarsenate; triphenylsulfonium tetrafluoroborate; triphenylsulfonium hexafluorophosphate; tris(4-phenoxyphenyl)sulfonium hexafluorophosphate; trifluoromethyldiphenylsulfonium tetrafluoroborate; p-chlorobenzenediazonium hexafluorophosphate; 2,4-dichlorobenzenediazonium tetrafluoroborate; p-methoxybenzenediazonium hexafluorophosphate; and bis-[4-(diphenylsulfonio)phenyl] sulfide bis-hexafluorophosphate.

The amount of the initiator may vary from as little as 0.5 percent by weight of the epoxidic prepolymer material to as much as 10.0 percent by weight thereof and is preferably on the order of 1.0–3.5 percent. If so desired, combinations of the initiators may be employed.

The composition desirably does not contain any compounds as diluents which will substantially solvate the vinyl chloride polymer. It may include up to about 10 percent by weight, based on the vinyl chloride polymer, of a suitable plasticizer therefor.

The several components of the composition must be thoroughly admixed to achieve a homogeneous dispersion of the vinyl chloride polymer in the epoxy prepolymer material. Generally, the conventional paste mixers employed for plastisol mixing will be adequate for this purpose, so long as they produce sufficient shearing action to obtain the desired dispersion. Typical mixers of this type include ribbon blenders, dough mixers, disc impellers, conical screw flight agitation mixtures and sand and ball milling equipment. Periods of about 2 to 15 minutes of shearing agitation are generally desirable to ensure adequate dispersion.

As indicated, the photoinitiator is decomposed into a Lewis acid by exposure to electromagnetic radiation. Although electron beam bombardment, X-ray radiation, and other similar forms of high energy radiation may be employed for this purpose, exposure to ultraviolet radiation has been found highly satisfactory and is desirable for commercial applications. The exposure to radiation normally required may be of extremely short duration, periods of about one-half to five seconds being normally adequate for most compositions depending upon the intensity of the radiation at the surface. However, for relatively thick coatings of the composition, it may be desirable to extend the period of exposure to ten seconds or even more, to ensure adequate penetration of the radiation through the depth of the coating.

The coating must be maintained within a relatively narrow elevated temperature range for a period of 0.5 second–2 minutes following initiation of exposure to the electromagnetic radiation in order to achieve the desired rapid polymerization of the epoxidic prepolymer material in the coating to a tack-free surface condition within a period of less than 30 seconds. Although this elevated temperature range may extend from 45° C. to as high as 125° C., it is generally held within the range of 50–90° C. to obtain rapid curing while avoiding adverse effects upon the epoxy polymer, as pointed out in the aforementioned copending application of Guarnery and Watt. Desirably, the temperature is maintained within the range of 55–70° C.

The temperature of the coating may be elevated to the desired temperature range to effect curing by any suitable means including induction heating when a metallic substrate is employed; conductive heating by passing or placing the coated substrate over a heated element or a source of heat to heat the substrate directly on its opposed surface; convection heating by passage of the coated strip through a heated chamber; and radiation heating by exposure of the coated strip to a source of suitable radiant heat such as infrared lamps. For convenience and for minimization of the equipment requirements, infrared radiation provided by suitable lamps is most desirably employed in conjunction with a source of the ultraviolet radiation used.

The coating may be elevated to the desired temperature range for curing the epoxy polymer of the coating either before or after exposure to the source of electromagnetic radiation. Moreover, the time period preceding or following exposure to the source of electromagnetic radiation is not critical so long as there is concurrently obtained activation of the initiator and maintenance of the coating within the desired temperature range for only a limited period of time, generally less than about two minutes and preferably less than about ten seconds. A protracted period of delay following exposure to the ultraviolet radiation before bringing the coating to the desired temperature may reduce the effectiveness of the method so that desirably the two steps occur within reasonably short periods of time, i.e., one minute or less.

Using the controlled temperature increase of Guarnery and Watt will effect curing of the coating to a tack-free surface condition within a period of less than 30 seconds and most generally within a period of less than 5 seconds following the occurrence of both radiation exposure and maintenance within the temperature range. This is particularly significant for high speed production lines where curing to a tack-free condition desirably should occur within two seconds or less. Full curing of the coating throughout its entire depth may continue after the time period described, particularly in the event of thicker coating deposits since the tack-free surface condition permits handling and further processing of the coated substrate. This initial temperature elevation may be conducted immediately preceding the fusing operation so long as the epoxidic material is allowed to substantially completely polymerize before being subjected to the higher fusing temperature.

Following substantially complete polymerization of the epoxidic prepolymer material of the coating which will occur rapidly at the low elevated temperatures, the coating comprises substantially unfused particles of the vinyl chloride polymers dispersed within the epoxy polymer. To obtain the maximum benefits of the composition, the coating is then subjected to a temperature of at least 140° C., and preferably 150-225° C., for a period of at least 2 minutes, and preferably 3-10 minutes, to substantially fuse the contiguous vinyl chloride polymer particles within the coating and to effect substantial cross-linking of the epoxy polymer. The resultant coating is hard, glossy and durable.

The baking of the coating may employ any of the techniques used to provide the low elevated temperatures for curing the epoxy prepolymer materials depending upon the substrate employed. In practice, passage through an oven is conveniently employed and serpentine paths may be used to provide adequate time to reach equilibrium.

The theory of operation of the present invention is not fully understood. It is recognized that the epoxy prepolymer material does partially wet the surface of the vinyl chloride dispersion polymer, as is evidenced by a minor initial increase in viscosity of the preferred compositions upon aging; however, the compositions preferably formulated do not substantially solvate the vinyl chloride polymer since equilibrium is generally attained and maintained for weeks. Subsequent to exposure of the coating to radiation, the initiator is decomposed and initiates polymerization of the epoxy prepolymer material to a tack-free condition. At this point, the vinyl chloride polymer particles are dispersed within the epoxy polymer, which, however, is only partially cross-linked. It is believed that the epoxy prepolymer material which has penetrated into the surface of the vinyl chloride polymer particles may not have polymerized at this point since the residual emulsifier generally present on the surface of the vinyl chloride polymer particles may have the tendency of terminating the initiator and the activation of the oxirane rings adjacent thereto or within the body of the particle.

However, in the subsequent fusing step, it is believed that the high temperature produces further polymerization of any epoxy prepolymer material including that which has penetrated the surface of the vinyl chloride polymer since the vinyl chloride polymer particle becomes softened at the fusing temperatures and various active species capable of initiating further polymerization at this elevated temperature are present in the coating material at this time. Moreover, active cross-linking of the epoxy compounds will occur at the elevated temperature. As a result, the baking step effects not only fusion of contiguous vinyl chloride particles but also substantial cross-linking of the epoxy material and physical bonding between the epoxy material and the vinyl chloride polymer.

The substrates which may be coated in accordance with the present invention include metallic substrates such as metal strip, formed container bodies, and the like, synthetic resin substrates such as polypropylene, polyvinyl chloride sheeting and container bodies; fibrous substrates such as nonwoven materials formed from natural fibers, synthetic fibers or mixtures of natural fibers and synthetic fibers; woven fabrics of natural and synthetic fibers, and mixtures thereof; and laminates of the various foregoing materials. In addition, ceramic substrates such as glass may also be employed.

The method of coating will normally depend upon the nature and shape of the substrate and the preceding and following production steps. Knife coating, gravure coating, spray coating, dipping and the like are all useful, depending upon the particular product involved.

The coating compositions of the present invention exhibit relatively stable viscosity levels for periods of one week and, in most instances, for one month and longer. However, optimum stability is obtained only when cycloaliphatic epoxy compounds are totally excluded as are all solvents for the vinyl chloride polymer. Generally, the Brookfield viscosity at 25° C. will be less than 1,000 centipoises and preferably in the range of 75-500 centipoises.

The compositions of the present invention are particularly applicable to various processes wherein durable coatings are desired for either aesthetic or protective purposes. The unpigmented and undyed compositions are substantially transparent and function well as clear varnishes. When dyes are included, tinted varnishes may be obtained; and dyes and pigments may be employed to obtain colored coatings. The coatings find particular advantage in the field of graphic arts because of the resistance of the coating to solvents and chemicals as well as to abrasion, because of the excellent adhesion to various surfaces including metals and because of the ability to withstand drawing and forming operations. For example, metal strip and container blanks, bodies and closures may be coated and then formed without substantial rupturing the coating. With some nonmetallic substrates such as synthetic resins, it may be desirable to apply a primer to improve adhesion of the coating.

Illustrative of the various aspects of the present invention are the following specific examples wherein all examples reflect parts by weight unless otherwise indicated. Except where otherwise indicated, the photoinitiator is a 33 percent by weight solution of p-methoxybenzenediazonium hexafluorophosphate in sulfolane.

EXAMPLE ONE

To demonstrate the benefits which are obtainable by incorporating the vinyl chloride dispersion polymer in an epoxy coating composition, two formulations are prepared.

| Component | Parts |
|---|---|
| Formulation I | |
| Monomeric diglycidyl ether of bis-phenol A (sold by Celanese Corporation under the designation JD-508) | 37.9 |
| Butanediol diglycidyl ether (sold by Ciba-Geigy (under the designation RD-2) | 56.8 |
| Silicone resin flow agent (Sold by General Electric under the designation SR-82) | 1.9 |
| Photoinitiator solution | 3.4 |
| Formulation II | |
| Monomeric diglycidyl ether of bis-phenol A (sold by Celanese Corporation under the designation JD-508) | 20.5 |
| Butanediol diglycidyl ether (sold by Ciba-Geigy (under the designation RD-2) | 30.7 |
| Vinyl chloride homopolymer (sold by B.F. Goodrich under the designation Geon 120X271) | 39.8 |
| n-butanol | 3.8 |
| Silicone resin flow agent (Sold by General Electric under the designation SR-82) | 1.8 |
| Photoinitiator solution | 3.4 |

Utilizing a #5 wire rod, the two coating formulations are applied to test specimens comprising 95 lb. tin-free steel panels. The panels are preheated to a temperature of 65° C. and irradiated using two 200 watt/linear inch high pressure mercury arc lamps while the panels are moving thereunder at a lineal speed of 110 feet per minute. The coatings provided by both formulations cure to a tack-free surface condition in less than 2 seconds. The coatings are then baked for 10 minutes at a temperature of 200° C.

Following baking, the test panels are lubricated with petrolatum and punched and curled to form the ends of cans. The punched and curled can ends are then submerged in a copper sulfate developer solution for a period of 10 minutes. This aqueous solution contains 198.8 grams per liter copper sulfate and 48.8 grams per liter concentrated hydrochloric acid; it will reveal or "develop" any imperfections in the coating. The specimens are examined and graded on a scale of 1–10 (10 representing the worst condition since the numerical values represent the square root of the percentage of exposed or developed surface).

The coated test specimens utilizing Formulation I are found to have a loose end grade of 7.75. The test panels produced utilizing Formulation II are found to have a loose end grade of 3.5, thereby indicating significant improvement in the ability of the coating to withstand the deleterious effects of the forming operation.

Coated metal specimens prepared from Formulation II are analyzed on a Perkins-Elmer TMS-1 thermomechanical analyzer. These specimens are found to exhibit two distinct glass transition (Tg) temperatures, namely, 38° C. and 68° C., which are attributable, respectively, to the epoxy and vinyl chloride polymer components in the coating.

Visual inspection of the coated panels indicates that the coatings in both instances are substantially transparent to provide a desirable appearing varnish finish for the can ends.

EXAMPLE TWO

To show the effect upon glass transition temperatures of varying the ratio of epoxidic prepolymer material to vinyl chloride polymer, a series of formulations are prepared.

| Component | Parts |
|---|---|
| Formulation I | |
| Low molecular weight bis-phenol A-based epoxy polymer (sold by Ciba-Geigy under the designation Araldite 6004) | 29.3 |
| Cumylphenyl glycidyl ether (sold by Kenrich Chemical Company under the designation CPE) | 11.8 |
| Butanediol diglycidyl ether (sold by Ciba-Geigy under the designation RD-2) | 21.4 |
| Vinyl chloride homopolymer dispersion resin (sold by B.F. Goodrich under the designation Geon 120X271) | 32.2 |
| Silicone resin flow agent (sold by General Electric under the designation SR-82) | 1.9 |
| Catalyst Solution | 3.4 |
| Formulation II | |
| Low molecular weight bis-phenol A-based epoxy polymer (sold by Ciba-Geigy under the designation Araldite 6004) | 25.0 |
| Cumylphenyl glycidyl ether (sold by Kenrich Chemical Company under the designation CPE) | 10.0 |
| Butanediol diglycidyl ether (sold by Ciba-Geigy under the designation RD-2) | 18.3 |
| Vinyl chloride homopolymer dispersion resin (sold by B.F. Goodrich under the designation Geon 120X271) | 36.9 |
| n-butanol | 4.5 |
| Silicone resin flow agent (sold by General Electric under the designation SR-82) | 1.9 |
| Catalyst Solution | 3.4 |
| Formulation III | |
| Low molecular weight bis-phenol A-based epoxy polymer (sold by Ciba-Geigy under the designation Araldite 6004) | 22.0 |
| Cumylphenyl glycidyl ether (sold by Kenrich Chemical Company under the designation CPE) | 8.8 |
| Butanediol diglycidyl ether (sold by Ciba-Geigy under the designation RD-2) | 16.1 |
| Vinyl chloride homopolymer dispersion resin (sold by B.F. Goodrich under the designation Geon 120X271) | 43.3 |
| n-butanol | 4.5 |
| Silicone resin flow agent (sold by Gemeral Electric under the designation SR-82) | 1.9 |
| Catalyst Solution | 3.4 |
| Formulation IV | |
| Low molecular weight bis-phenol A-based epoxy polymer (sold by Ciba-Geigy under the designation Araldite 6004) | 19.1 |
| Cumylphenyl glycidyl ether (sold by Kenrich Chemical Company under the designation CPE) | 7.7 |
| Butanediol diglycidyl ether (sold by Ciba-Geigy under the designation RD-2) | 13.9 |
| Vinyl chloride homopolymer dispersion resin (sold by B.F. Goodrich under the designation Geon 120X271) | 49.5 |
| n-butanol | 4.5 |
| Silicone resin flow agent (sold by General Electric under the designation SR-82) | 1.9 |
| Catalyst Solution | 3.4 |

The formulations are then applied to panels in the manner described in Example One and the coatings are cured and baked in the same manner. The baked coatings on the specimens are analyzed on the thermomechanical analyzer and the following results are observed.

| Formulation | PVC, as % NVM | Tg, C., (1) | Tg, C., (2) |
|---|---|---|---|
| I | 34.0 | 11 | 70 |
| II | 39.0 | 26 | 73 |
| III | 45.7 | 35 | 71 |
| IV | 52.3 | 37 | 73 |

From this data, it can be seen that increasing the vinyl chloride polymer content of the coating increases the first glass transition temperature which is that defined by the epoxy polymer. This data further demonstrates the complex interaction between the vinyl chloride and the epoxy polymer components of the compositions of the present invention insofar as the glass transition temperature of the epoxy polymer [Tg(1)] can be altered by varying the amount of vinyl chloride polymer in the formulation. This is significant since the coating preferably should maintain its integrity at the temperatures of the forming operations.

EXAMPLE THREE

For some applications where extreme forming operations are conducted such as the double seaming of a beverage can end, it is desirable to maintain good mechanical properties in the coating at the elevated temperature where the severe metal deformation takes place. Accordingly, a formulation is prepared which exhibits a single glass transition temperature of 71° C.

| Component | Parts |
|---|---|
| Monomeric diglycidyl ether of bis-phenol A (sold by Celanese Corporation under the designation JD-508) | 18.2 |
| Butanediol diglycidyl ether (sold by Ciba-Geigy under the designation RD-2) | 9.3 |
| Cumylphenyl glycidyl ether (sold by Kenrich Chemical Company under the designation CPE) | 5.9 |
| Vinyl chloride homopolymer dispersion resin (sold by B.F. Goodrich under the designation Geon 120X271) | 52.5 |
| Silicone resin flow (sold by General Electric under the designation SR-82) | 1.8 |
| n-butanol | 8.8 |
| Photoinitiator | 3.5 |

The formulation is found to have an initial viscosity at 25° C. of 440 cps. The procedure of Example One is repeated to produce a cured and baked coating on test specimens which are formed into can ends in similar fashion and then developed in the copper sulfate solution. Curing to a tack-free surface condition is found to occur in 2 seconds. The formed ends are found to have a loose end grade of 4.0.

This experiment would appear to indicate the following with respect to the coatings of the present invention. As initially cured, the single low glass transition temperature of the coating corresponds to the epoxy component and appears to indicate that the vinyl chloride polymer is present in the coating as a dispersed phase which is not fully bonded to the epoxy polymer. Upon baking, the vinyl chloride polymer fuses and is bonded to the epoxy polymer in an interpenetrating network as represented by the two distinct glass transition temperatures; as the vinyl chloride polymer content is increased, the amount of interpenetration is increased to the extent where apparent homogeneity is obtained in the resin system.

EXAMPLE FOUR

In each of the preceding formulations, the initiator has been a diazonium catalyst. To evaluate the more recently advocated sulfonium catalysts in the compositions of the present invention, the following formulation is prepared.

| Component | Parts |
|---|---|
| Low molecular weight bis-phenol A-based epoxy polymer (sold by Ciba-Geigy under the designation Araldite 6004) | 27.3 |
| Butanediol diglycidyl ether (sold by Ciba-Geigy under the designation RD-2) | 20.0 |
| Cresyl glycidyl ether (sold by Celanese Corporation under the designation Epirez 5011) | 9.1 |
| Vinyl chloride homopolymer dispersion resin (sold by B.F. Goodrich under the designation Geon 120X271) | 34.5 |
| Silicone resin flow agent (sold by General Electric under the designation SR-82) | 1.8 |
| Sulfonium photoinitiator (Sold by 3M Company under the designation FC-503) | 7.3 |

The formulation is found to have an initial viscosity at 25° C. of 410 cps. and is coated onto test panels and cured as in the method of Example One. Curing to a tack-free condition is found to occur within 2.5 seconds following the initiation of exposure to radiation. The loose end grade of the can end specimens is found to be 5.0.

EXAMPLE FIVE

Indicative of the effect on stability of the cycloaliphatic epoxy compounds in the coating formulations of the present invention is the data set forth hereafter with respect to dispersions of the same vinyl chloride polymer (a PVC homopolymer sold by Tenneco under the designation PVC T-1730) in different epoxidic prepolymer materials.

| Component | Parts |
|---|---|
| MIXTURE I | |
| Vinyl Chloride Polymer | 25.5 |
| Cycloaliphatic epoxide material (sold by Union Carbide under the designation ERL 4221) | 74.5 |
| 24 hour viscosity at 25° C. = 100,000 + cps. | |
| 264 hour viscosity at 25° C. = gel | |
| Percent change = not applicable | |
| MIXTURE II | |
| Vinyl Chloride Polymer | 26.1 |
| Cycloaliphatic epoxide material (sold by Union Carbide under the designation ERL 4299) | 73.9 |
| 24 hour viscosity at 25° C. = 6300 cps. | |
| 264 hour viscosity at 25° C. = 35,000 cps. | |
| Percent change = +456 | |
| MIXTURE III | |
| Vinyl Chloride Polymer | 26.0 |
| Butanediol diglycidyl ether (sold by Ciba-Geigy under the designation RD-2) | 74.0 |
| 24 hour viscosity at 25° C. = 232 cps. | |
| 264 hour viscosity at 25° C. = 260 cps. | |
| Percent change = +12 | |
| MIXTURE IV | |
| Vinyl Chloride Polymer | 26.8 |
| Cresyl glycidyl ether (sold by Celanese Corporation under the designation ER 5011) | 73.2 |

-continued

| Component | Parts |
|---|---|
| 24 hour viscosity at 25° C. = 590 cps. | |
| 264 hour viscosity at 25° C. = 550 cps. | |
| Percent change = −7 | |

The first two mixtures show the instability of compositions using cycloaliphatic epoxy compounds. Other test data indicates a dramatic increase in viscosity in otherwise stable coating formulations when the percentage of cycloaliphatic epoxy compounds increases above 15 percent and significantly improved stability as the percentage is decreased from that amount.

EXAMPLE SIX

The following formulation is exemplary of a preferred composition for providing a clear varnish coating on steel strip to be formed into can ends.

| Component | Parts |
|---|---|
| Monomeric diglycidyl ether of bis-phenol A (sold by Celanese Corporation under the designation JD-508) | 22.2 |
| Butanediol diglycidyl ether (sold by Ciba-Geigy under the designaton RD-2) | 11.2 |
| Vinyl chloride homopolymer dispersion resin (sold by B. F. Goodrich under the designation Geon 120X271) | 52.6 |
| Silicone resin flow agent (sold by General Electric under the designation SR-82) | 1.7 |
| n-butanol | 8.8 |
| Photoinitiator | 3.5 |

This composition is found to have an initial viscosity at 25° C. of 490 cps. This composition is applied to the strip, and the coating is desirably preheated to the cure accelerating temperature of 65° C. before being exposed to ultraviolet radiation to produce curing to a tack-free surface condition in 2 seconds. Following curing, the coating is baked at 200° C. for 10 minutes to effect fusion of the vinyl chloride polymer and cross-linking of the epoxy polymer. The glass transition temperature of the coating is found to be 74° C.

Following forming into loose can ends, the specimens are developed in the copper sulfate solution and found to have a loose end grade of 3.0.

EXAMPLE SEVEN

A formulation is prepared using both vinyl chloride homopolymer and a vinyl chloride/vinyl acetate copolymer.

| Component | Parts |
|---|---|
| Vinyl chloride homopolymer dispersion resin (sold by B. F. Goodrich under the designation Geon 120X271) | 27.5 |
| Vinyl chloride/vinyl acetate copolymer (7% VA) (Sold by Tenneco under the designation T-0765) | 8.5 |
| Low molecular weight bis-phenol A-based epoxy polymer (sold by Ciba-Geigy under the designation Araldite 6004) | 28.4 |
| Butanediol diglycidyl ether (sold by Ciba-Geigy under the designation RD-2) | 20.8 |
| Cresyl glycidyl ether (sold by Celanese Corporation under the designation Epirez 5011) | 9.5 |
| Silicone resin flow agent (sold by General Electric under the designation SR-82) | 1.9 |
| Photoinitiator Solution | 3.4 |

The initial viscosity is found to be 1,060 cps. at 25° C. Coated specimens are prepared, cured and baked in the manner described in Example One. The coating cures in 2 seconds following initiation of exposure to radiation. Can ends formed as in Example One are found to have a loose end grade of 5.5.

From the foregoing detailed specification and examples, it can be seen that the compositions of the present invention afford desirable stability, good curing characteristics, good physical properties, and obvious economic benefits as compared to the cost of pure epoxy formulations. They may be formulated readily and may be cured rapidly to a tack-free condition so as to permit their use on high speed production lines. Thereafter, they may be baked either independently of other operations or conveniently as a part of other operations to fuse the vinyl chloride polymer component and fully bond the two components while effecting substantial cross-linking of the epoxy component, thus providing optimum benefits.

Having thus described the invention, we claim:

1. A polymerizable coating composition consisting essentially of:
   A. 35–80 parts of an epoxidic prepolymer material including not more than about 15 percent by weight of cycloaliphatic epoxide compounds;
   B. 20–65 parts of a vinyl chloride dispersion polymer having a high molecular weight represented by inherent viscosity of 0.60–1.60 as determined by the method of ASTM D1243-66 and a particle size of 0.5–20.0 microns, the particles of said vinyl chloride polymer being dispersible in said epoxidic prepolymer material and being wettable thereby but substantially insoluble therein;
   C. 0.5–10.0 percent by weight of said epoxidic prepolymer material of an onium salt photoinitiator which decomposes upon exposure to electromagnetic radiation to initiate polymerization of said epoxidic prepolymer material; and,
   D. as optional additives, pigments, dyes, fillers and processing aids,
   said composition being substantially free from diluent compounds which would substantially solvate the vinyl chloride polymer and containing not more than about 10 percent, based upon the weight of the vinyl chloride polymer, of a plasticizer therefor.

2. The coating composition in accordance with claim 1 wherein said epoxidic prepolymer material comprises 45–65 parts and said vinyl chloride dispersion polymer comprises 35–55 parts.

3. The coating composition in accordance with claim 1 wherein said vinyl chloride polymer is a homopolymer of vinyl chloride.

4. The coating composition in accordance with claim 1 wherein said vinyl chloride polymer is a copolymer of vinyl chloride with minor amounts of vinyl acetate.

5. The coating composition in accordance with claim 1 wherein said epoxidic prepolymer material is substantially free from cycloaliphatic epoxide compounds.

6. The coating composition in accordance with claim 1 wherein said epoxidic prepolymer material is comprised principally of a glycidyl ether of an aromatic alcohol.

7. The coating composition in accordance with claim 1 wherein there is additionally included 1–10 percent by weight of a pigment which is substantially nonabsorbent of radiation of the wavelength to which said initiator is susceptible.

8. In the method of coating substrates with an organic coating material, the steps comprising:

A. admixing (1) 35-80 parts by weight of an epoxidic prepolymer material including not more than about 15 percent of cycloaliphatic epoxide compounds based upon the total weight of said epoxidic prepolymer material, (2) 20-65 parts by weight of a vinyl chloride dispersion polymer having a high molecular weight represented by an inherent viscosity of 0.60-1.60 as determined by the method of ASTM D1243-66 and a particle size of 0.5-20.0 microns, the particles of said vinyl chloride polymer being dispersible in said epoxidic prepolymer material and being wettable thereby but substantially insoluble therein, (3) 0.5-10.0 percent by weight of said epoxidic prepolymer material of an onium salt photoinitiator which decomposes upon exposure to electromagnetic radiation to effect polymerization of said epoxidic prepolymer material and, (4) as optional additives, pigments, dyes, fillers and processing aids, said admixture providing a coating formulation consisting essentially of said epoxidic prepolymer material, vinyl chloride dispersion polymer, onium salt photoinitiator and optional additives, said composition being substantially free from diluent compounds which would substantially solvate the vinyl chloride polymer and containing not more than about 10 percent, based upon the weight of the vinyl chloride polymer, of a plasticizer therefor;

B. coating a substrate with said coating forumulation; and

C. exposing said coating to a source of electromagnetic radiation to decompose said photoinitiator to initiate polymerization of said epoxidic prepolymer material to an epoxy polymer and effect curing of said coating to a tack-free surface condition in which said vinyl chloride polymer is dispersed within the epoxy polymer.

9. The method in accordance with claim 8 wherein said epoxidic prepolymer material comprises 45-65 parts and said vinyl chloride dispersion polymer comprises 35-55 parts.

10. The method in accordance with claim 8 wherein said vinyl chloride polymer is a homopolymer of vinyl chloride.

11. The method in accordance with claim 8 wherein said epoxidic prepolymer material is substantially free from cycloaliphatic epoxide compounds.

12. The method in accordance with claim 11 wherein said coating is maintained at a temperature of about 50°-90° C. for a period of at least about 0.5 second and less than about 2 minutes following initiation of said exposure to radiation to effect polymerization of the coating to a substantially tack-free condition in a period of less than 30 seconds following the combination of said steps of radiation exposure and temperature maintenance.

13. The method in accordance with claim 8 wherein said epoxidic prepolymer material includes 1-10 percent by weight of a pigment which is substantially nonabsorbent of radiation of the wave length to which said initiator is susceptible.

14. The method in accordance with claim 8 wherein following the decomposition of said coating and the curing of said coating to a tack-free condition, the coating is baked at a temperature of at least 140° C. for a period of at least 2 minutes to effect substantial fusion of the vinyl chloride polymer and substantial cross-linking of the epoxy polymer.

15. An article having a substrate and a coating on at least one surface of said substrate, said coating consisting essentially of: (1) 35-80 percent, based upon resin content, of an epoxy polymer including not more than about 15 percent by weight cycloaliphatic epoxide compounds based upon the total weight of the epoxy polymer, (2) 20-65 percent, based upon resin content, of a vinyl chloride dispersion polymer having a high molecular weight represented by an inherent viscosity of 0.60-1.60 as determined by the method of ASTM D1243-66 and a particle size of 0.5-20.0 microns and, (3) as optional additives, pigments, dyes, fillers and processing aids, said coating containing not more than 10 percent, based upon the weight of said vinyl chloride polymer, of a plasticizer therefor, said vinyl chloride dispersion polymer being dispersed within and bonded to said epoxy polymer, the particles of vinyl chloride polymer being substantially fused and the epoxy polymer being substantially cross linked.

16. The article in accordance with claim 15 wherein said epoxy polymer content is 45-65 percent by weight and said vinyl chloride polymer content is 35-55 percent by weight.

17. The article in accordance with claim 15 wherein said vinyl chloride polymer is a homopolymer of vinyl chloride.

18. The article in accordance with claim 15 wherein said epoxy polymer is substantially free from cycloaliphatic epoxide compounds.

19. The article in accordance with claim 15 wherein said coating includes 1-10 percent of a pigment.

20. The article in accordance with claim 15 wherein said coating is substantially transparent.

* * * * *